(12) United States Patent
Banach et al.

(10) Patent No.: US 9,765,174 B2
(45) Date of Patent: Sep. 19, 2017

(54) MODIFIED PHENOLIC RESINS AND METHODS OF MAKING AND USING THE SAME AS REINFORCING RESINS

(71) Applicant: SI Group, Inc., Schenectady, NY (US)

(72) Inventors: Timothy E. Banach, Scotia, NY (US); John Morgan Whitney, Niskayuna, NY (US); James J. Lamb, Duanesburg, NY (US)

(73) Assignee: SI Group, Inc., Schenectady, NY (US)

(*) Notice: Subject to any disclaimer, the term of this patent is extended or adjusted under 35 U.S.C. 154(b) by 0 days.

(21) Appl. No.: 14/710,273

(22) Filed: May 12, 2015

(65) Prior Publication Data

US 2015/0322193 A1    Nov. 12, 2015

Related U.S. Application Data

(60) Provisional application No. 61/992,075, filed on May 12, 2014.

(51) Int. Cl.
*C08G 8/28* (2006.01)
*C08L 15/00* (2006.01)

(52) U.S. Cl.
CPC ............... *C08G 8/28* (2013.01); *C08L 15/00* (2013.01)

(58) Field of Classification Search
None
See application file for complete search history.

(56) References Cited

U.S. PATENT DOCUMENTS

| 4,268,657 A | * | 5/1981 | Manzara | C08G 8/24 260/998.13 |
| 4,608,408 A | * | 8/1986 | Hood | C08G 8/24 428/529 |
| 5,847,058 A | * | 12/1998 | Teodorczyk | C08G 8/24 264/241 |

FOREIGN PATENT DOCUMENTS

| GB | 1493760 | * | 10/1976 |
| GB | 1493760 |   | 11/1977 |
| GB | 1593933 |   | 7/1981 |
| JP | 62119220 |   | 5/1987 |
| WO | 2005052017 |   | 6/2005 |
| WO | 2006075604 |   | 7/2006 |

* cited by examiner

*Primary Examiner* — Robert C Boyle
(74) *Attorney, Agent, or Firm* — Jeffrey N. Townes; LeClairRyan

(57) ABSTRACT

This invention relates to processes for preparing novolak resins and using the same as reinforcing resins. One process comprises reacting one or more alkylphenols with an aldehyde in the presence of a base to form a resole resin, wherein for each mole of alkylphenol at least 1.5 moles of aldehyde are reacted; and reacting the resole resin with one or more phenolic compounds in the presence of an acidic catalyst to form a novolac resin, wherein for each mole of alkylphenol at least 1.5 moles of the phenolic compounds are reacted. Another process comprises reacting one or more alkylphenols with an aldehyde in the presence of a base to form a resole resin, and reacting the resole resin with one or more phenolic compounds under an elevated temperature to form a novolac resin.

19 Claims, 3 Drawing Sheets

Step 1. Methylolation of Alkylphenol

Alkylphenol

Step 2. Reaction with Phenols and Formaldehyde (HCHO)

when there is a 1:2 ratio alkylphenol to phenol when there is a 1:3 ratio alkylphenol to phenol This also requires an increase in the amount of HCHO used in the second step. That needs to remain the same OR get bigger, but no smaller and there is a limit to how much greater

MODIFIED PHENOLIC RESINS AND METHODS OF MAKING AND USING THE SAME AS REINFORCING RESINS

This application claims the benefit of priority of U.S. Provisional Patent Application Ser. No. 61/992,075, filed May 12, 2014, which is hereby incorporated by reference in its entirety.

FIELD OF THE INVENTION

This invention generally relates to a modified phenolic novolac and processes for making the modified phenolic novolac resin and using the same as reinforcing resins.

BACKGROUND

Reinforcing resins are typically phenolic novolac resins that are used to increase the hardness and low-strain modulus (stiffness) of rubber compounds. Reinforcing resins can be used with a methylene donor (e.g., hexamethoxymethylmelamine (HMMM) or hexamethylenetetramine (HEXA/HMT)) in a rubber composition so that they cure while the rubber compound is being cured by sulfur.

Phenol-formaldehyde resins and phenol-formaldehyde resins modified with fatty acids (e.g., a phenol-formaldehyde resin modified with a distilled tall oil or cashew nut shell liquid and subjected to a heat treatment) have been used as reinforcing resins. These reinforcing resins, when used in a rubber composition, can increase the modulus at low percentage strain and dynamic strain of the rubber compound. When using reinforcing resins, it is a desirable to increase the hardness of the rubber compound. However, the cure characteristics (scorch or early onset of cure) of the rubber compounds when incorporating these reinforcing resins may be negatively impacted. Moreover, adding these reinforcing resins typically increases mixing viscosity of the rubber composition, making the formulation process for the rubber compounds more difficult and more energy consuming and time-consuming.

The conventional process of preparing reinforcing resins by reacting alkylphenol and/or phenol directly with aldehyde can leave a significant amount of residual monomers in the resins. However, it is desirable to reduce the residual phenolic monomer(s) in the resulting reinforcing resins for environmental reasons as well as for reducing the toxicity of the resins. For example, alkylphenols such as para-tertiary octylphenol (PTOP) are the object of environmental and toxicological studies (risk assessment studies), and it is typically desirable to limit their use in the free monomeric form in novolac alkylphenol resins. Decreasing free alkylphenol monomers in resins also permits a simpler manipulation of resins by decreasing the vapor emissions of alkylphenol monomers in factories or in atmospheric discharges when they are used, particularly in rubber applications when vulcanization is carried out at an elevated temperature.

Although the free residual monomer(s) in the resins can be distilled out at the end of the resin synthesis, this conventional distillation process presents several disadvantages. First, the distillation of the free monomer(s) of alkylphenol or phenol brings a non-trivial loss of primary material and requires recycling or treatment of the distilled alkylphenol or phenol. Second, the process is difficult to implement at an industrial level for an alkylphenol, such as PTOP, which has very high boiling point, and thus additional equipment, such as a powerful vacuum and/or elevated temperatures are used in the reactor. Moreover, alkylphenols (e.g., para-tertiary butylphenol (PTBP) and PTOP) are typically solid compounds and can crystallize in the piping, which requires reheating to prevent plugs.

Therefore, there remains a need to develop a process for preparing reinforcing resins, which, when used in a rubber composition, not only provides increased modulus and hardness of the rubber composition, but also improves the cure characteristics and reduces the mixing viscosity of the rubber composition. There is also a need to develop a process for preparing reinforcing resins that can reduce free residual monomer content in the resulting resins. This invention answers those needs.

SUMMARY OF THE INVENTION

One aspect of the invention relates to a process for preparing a novolac resin. The process comprises the step of reacting one or more alkylphenols with an aldehyde in the presence of a base to form a resole resin. For each mole of alkylphenol at least 1.5 moles of aldehyde are reacted. The resole resin is then reacted with one or more phenolic compounds in the presence of an acidic catalyst to form a novolac resin. For each mole of alkylphenol at least 1.5 moles of the phenolic compounds are reacted.

Another aspect of the invention relates to a process for preparing a novolac resin. The process comprises the step of reacting one or more alkylphenols with an aldehyde in the presence of a base to form a resole resin. For each mole of alkylphenol at least 1.5 moles of aldehyde are reacted. The resole resin is then reacted with one or more phenolic compounds under an elevated temperature to form a novolac resin. For each mole of alkylphenol at least 1.5 moles of the phenolic compounds are reacted.

Another aspect of the invention relates to a novolac resin. The novolac resin is prepared by a process comprising a step of reacting one or more alkylphenols with an aldehyde in the presence of a base to form a resole resin. For each mole of alkylphenol at least 1.5 moles of aldehyde are reacted. The resole resin is then reacted with one or more phenolic compounds in the presence of an acidic catalyst. For each mole of alkylphenol at least 1.5 moles of the phenolic compounds are reacted.

Another aspect of the invention relates to a novolac resin. The novolac resin is prepared by a process comprising a step of reacting one or more alkylphenols with an aldehyde in the presence of a base to form a resole resin. For each mole of alkylphenol at least 1.5 moles of aldehyde are reacted. The resole resin is then reacted with one or more phenolic compounds under an elevated temperature. For each mole of alkylphenol at least 1.5 moles of the phenolic compounds are reacted.

Another aspect of the invention relates to a rubber composition having an improved mixing viscosity. The rubber composition comprises a novolac resin comprising phenolic monomer units that are formed from: 50-75 wt % of one or more alkylphenols, 25-50 wt % of phenol, and 0-25 wt % of resorcinol. The novolac resin has a residual alkylphenol of less than 1%, and a residual phenol of less than 1%.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combina-

DETAILED DESCRIPTION OF THE INVENTION

This invention relates to the discovery of novel processes to make a mixed alkylphenol-phenol novolac resin of a construction that provides reinforcing resins with superior properties. These resins, when used with rubber compounds, increase the modulus and hardness, reduce the scorch, improve the total cure time, and unexpectedly, significantly reduce the mixing viscosity of the rubber compounds. Reducing the mixing viscosity provides several benefits. First, it gives the rubber compound an expanded formulation window, i.e., more fillers can be added to rubber compounds to improve desired properties while maintaining the ability to compound the rubber formulation in a commercial equipment. Second, it can reduce the energy consumption during mixing of rubber formulas, thereby saving cost in the production of rubber articles. Third, it can reduce the amount of time required to mix the rubber formulation, thereby increasing throughput of the mixing equipment, thus saving production costs.

Additionally, the processes disclosed in this invention are advantageous because the processes are able to incorporate a significant portion of alkylphenol in the final resins with significantly less residual monomers in the resulting resins (e.g., less than 1% residual alkylphenol or phenol monomers). The conventional process for preparing novolac resins involves simply reacting the alkylphenol and/or phenol mixture with an acid and formaldehyde. However, such a process does not result in a material that incorporates the alkylphenol to any significant degree, and in general leads to a gelled product, when using the same ratios of phenolics (alkylphenol and/or phenol) to formaldehyde.

One way to overcome such deficiencies is by controlling the molar content of the reactants. Accordingly, one aspect of the invention relates to a process for preparing a novolac resin that reacts one or more alkylphenols with an aldehyde, wherein for each mole of alkylphenol at least 1.5 moles of aldehyde are reacted. The resulting resole resin is then reacted with one or more phenolic compounds in the presence of an acidic catalyst to form a novolac resin, wherein for each mole of alkylphenol at least 1.5 moles of the phenolic compounds are reacted.

The step of reacting one or more alkylphenols with an aldehyde to form a resole resin is conducted at a temperature ranging from 50 to 90° C. Typically, the reaction temperature ranges from 50 to 75° C. Suitable bases for preparing resole resins include ammonium hydroxide; tertiary amines such as triethylamine, triethanolamine, diethyl cyclohexyl amine, triisobutyl amine; and alkali and alkaline earth metal oxides and hydroxides. A typical base used is an alkali or alkaline earth metal oxide or hydroxide, such as sodium hydroxide.

The step of reacting one or more alkylphenols with an aldehyde to form a resole resin is conducted with a molar ratio of an aldehyde to alkylphenols of at least 1:1. For example, the molar ratio of an aldehyde to alkylphenols can be at least 1.5:1, at least 2:1, or at least 3:1, or ranges from 1.5:1 to 3:1, from 1.5:1 to 2.5:1, from 1.5:1 to 2:1, or from 2:1 to 3:1.

The step of reacting the resole resin with one or more phenolic compounds is conducted at a temperature ranging from room temperature to 130° C. Typically, the reaction temperature ranges from 80 to 130° C., from 80 to 120° C., or from 90 to 110° C.

The amount of phenolic compounds added to react with the resole resin is in a moral ratio of phenolic compounds to alkylphenols ranging from 1:1 to 5:1. For example, the moral ratio of phenolic compounds to alkylphenols can range from 1:1 to 3:1, from 1.5:1 to 3:1, from 1.5:1 to 2:1, or from 2:1 to 3:1.

Suitable acidic catalysts for reacting the resole resin with one or more phenolic compounds include, but not limited to, mineral or organic acids, alone or in a mixture. Exemplary acidic catalysts are sulfuric acid, ethanesulfonic acid, benzenesulfonic acid, benzenedisulfonic acid, chlorobenzenesulfonic acid, 3,4-dichlorobenzene sulfonic acid, cresolsulfonic acids, phenol sulfonic acids, toluenesulfonic acids, xylenesulfonic acids, octyiphenolsulfonic acid, naphthalenesulfonic acid, 1-naphthol-4-sulfonic acid, dodecylsulfonic acid, dodecylbenzensulfonic acid, phosphoric acid, oxalic acid, and formic acid. Typical catalysts used are sulfuric acid, a sulfonic acid such as p-toluenesulfonic acid (PTSA), phosphoric acid, or oxalic acid. The amount of the acidic catalyst may range from about 0.1 wt % to about 20 wt %, from about 0.1 wt % to about 10 wt %, or from 0.1 wt % to about 2 wt % of the total reactants.

After the step of reacting the resole resin with one or more phenolic compounds, the process may further comprise a step of adding additional aldehyde. The amount of an additional aldehyde added typically depends on the amount of alkylphenols and aldehyde added in the resole-resin forming stage, and the amount of phenolic compound added to react with the resole resin. The amount of the additional aldehyde added should be sufficient to scavenge any remaining phenolic compound or alkylphenol in the final novolac resin; the amount of additional aldehyde. On the other hand, the amount of the additional aldehyde added also depends on the desired molecular weight and/or desired melting point for the final resin product.

Typically, the molar ratio of the amount of an aldehyde added altogether during the entire process to the total amount of alkylphenols and phenolic compounds added altogether during the entire process is no more than 1:1, or ranges from 0.5:1 to 1:1, from 0.8:1 to 1:1, or 0.9:1 to 1:1.

Suitable alkylphenols may have one or more alkyl groups in the ortho, meta, and/or para positions of the phenol.

Typical alkylphenols include those having one alkyl group, e.g., at the para position of the phenol; and those having two alkyl groups. The alkyl group of the alkylphenols may be a linear, branched, or cyclic alkyl containing 1 to 30 carbon atoms. Typically, the alkyl group of the alkylphenols contains at least 4 carbon atoms, e.g., at least 7, at least 8, at least 10, at least 12, at least 16, at least 20, at least 22, or at least 24 carbon atoms. For example, the alkyl group of the alkylphenols contains 4 to 28 carbon atoms, 10 to 28 carbon atoms, 12 to 28 carbon atoms, 20 to 28 carbon atoms, or 24 to 28 carbon atoms. Exemplary alkylphenols include para-methylphenol, para-tert-butylphenol (PTBP), para-sec-butylphenol, para-tert-hexylphenol, para-cyclohexylphenol, para-heptylphenol, para-tert-octylphenol (PTOP), para-isooctylphenol, para-decylphenol, para-dodecylphenol (PDDP), para-tetradecyl phenol, para-octadecylphenol, para-nonylphenol, para-pentadecylphenol, and para-cetylphenol. In one embodiment, the alkylphenols include $C_7$ or $C_{12}$ alkylphenol, such as para-heptylphenol or PDDP. In another embodiment, at least one alkyl group in the alkylphenols is not $C_8$.

Any aldehyde known in the art for preparing an alkylphenol-aldehyde resin is suitable in the in-situ process. Exemplary aldehydes include formaldehyde, methylformcel, butylformcel, acetaldehyde, propionaldehde, butyraldehyde, crotonaldehyde, valeraldehyde, caproaldehyde, heptaldehyde, benzaldehyde, as well as compounds that decompose to aldehyde such as paraformaldehyde, trioxane, furfural, hexamethylenetriamine, aldol, β-hydroxybutyraldelhyde, and acetals, and mixtures thereof. A typical aldehyde used is formaldehyde.

Suitable phenolic compounds may be a monohydric, dihydric, or polyhydric phenol. Exemplary phenolic compounds include phenol; a dihydricphenol such as resorcinol, catechol, and hydroquinone; a dihydroxybiphenol; an alkylidenebisphenol such as 4,4'-methylenediphenol (bisphenol F), and 4,4'-isopropylidenediphenol (bisphenol A); a trihydroxybiphenol; and a thiobisphenol. Typical phenolic compounds include phenol, resorcinol, or mixtures thereof.

In an exemplary embodiment, the phenolic compound is phenol. The phenolic compound may further comprise resorcinol. When the phenolic compound is a mixture of phenol and resorcinol, it can contain about 15-85 wt % phenol and about 15-85 wt % resorcinol. For example, the phenolic compound can contain about 50-85 wt % phenol and about 15-50 wt % resorcinol, about 50-80 wt % phenol and about 20-50 wt % resorcinol, about 50-70% phenol and about 30-50 wt % resorcinol, about 50-66 wt % phenol and about 34-50 wt % resorcinol, or about 50-55 wt % phenol and about 45-50 wt % resorcinol.

An exemplary embodiment of this process is illustrated below in Scheme 1. The resins are prepared by first making a resole resin using one molar equivalent of alkylphenol, a base, and two molar equivalents of formaldehyde to methylolate the alkylphenol to form a resole resin. The base in the resole resin is then neutralized with an acid and two molar equivalents of a phenolic monomer (e.g., phenol) is added along with a catalytic amount of an acid catalyst. The condensation reaction is then conducted under an acidic condition to obtain the desired resin, with additional formaldehyde added to react with any remaining phenol. If desired, more aldehyde can be added to reach a desired molecular weight and/or melting point for the final resin product.

Scheme 1
Reaction 1

This invention also relates to a novolac resin prepared by the process as discussed in the above embodiments.

Accordingly, one aspect of the invention relates to a novolac resin prepared by a process comprising a step of reacting one or more alkylphenols with an aldehyde in the presence of a base to form a resole resin. For each mole of alkylphenol at least 1.5 moles of aldehyde are reacted. The resole resin is then reacted with one or more phenolic compounds in the presence of an acidic catalyst. For each mole of alkylphenol at least 1.5 moles of the phenolic compounds are reacted. The novolac resin, when used in a rubber composition, improves the mixing viscosity for the rubber composition.

Suitable alkylphenols, aldehydes, bases, phenolic compounds, and acidic catalysts, as well as suitable reaction conditions for preparing these novolac resins, are the same as those descriptions relating to the process as discussed in the above embodiments. The resulting novolac resins depend upon the starting materials and reaction conditions used.

Using the process as discussed in the above embodiments, the resulting novolac resins have a significantly reduced amount of residual phenolic monomers. For example, the residual alkylphenol monomer in the resins can be less than 2 wt %, less than 1 wt %, less than 0.5 wt %, or less than 0.1 wt %. The residual phenol monomer in the resins can be less than 2 wt %, less than 1 wt %, less than 0.5 wt %, or less than 0.1 wt %.

Another aspect of the invention relates to a process for preparing a novolac resin by reacting one or more alkylphenols with an aldehyde, wherein for each mole of alkylphenol at least 1.5 moles of aldehyde are reacted. The resulting resole resin is reacted with one or more phenolic compounds under an elevated temperature to form a novolac resin, wherein for each mole of alkylphenol at least 1.5 moles of the phenolic compounds are reacted.

The step of reacting one or more alkylphenols with an aldehyde is conducted at a temperature ranging from 50 to 90° C. Typically, the reaction temperature ranges from 50 to 75° C. Suitable bases for preparing resole resins include ammonium hydroxide; tertiary amines such as triethylamine, triethanolamine, diethyl cyclohexyl amine, triisobutyl amine; and alkali and alkaline earth metal oxides and hydroxides.

The step of reacting one or more alkylphenols with an aldehyde to form a resole resin is conducted with a molar ratio of an aldehyde to alkylphenols of at least 1:1. For example, the molar ratio of an aldehyde to alkylphenols can be at least 1.5:1, at least 2:1, or at least 3:1, or ranges from 1:5 to 3:1, from 1.5:1 to 2.5:1, from 1.5:1 to 2:1, or from 2:1 to 3:1.

The step of reacting the resole resin with one or more phenolic compounds is conducted at a temperature ranging from 100 to 200° C. Typically, the reaction temperature ranges from 130 to 200° C., or from 130 to 180° C.

The amount of the phenolic compounds added to react with the resole resin is in a moral ratio of phenolic compounds to alkylphenols ranging from 1:1 to 5:1. For example, the moral ratio of phenolic compounds to alkylphenols can range from 1:1 to 3:1, from 1.5:1 to 3:1, from 1.5:1 to 2:1, or from 2:1 to 3:1.

After the step of reacting the resole resin with one or more phenolic compounds, the process may further comprise a step of neutralizing the resole resin with an acid, and adding additional aldehyde. The amount of an aldehyde then added together with an acid typically depends on the amount of alkylphenols and aldehyde added in the resole-resin forming stage, and the amount of phenolic compound added to react with the resole resin. The amount of the additional aldehyde added should be sufficient to scavenge any remaining phenolic compound or alkylphenol in the final novolac resin. On the other hand, the amount of the additional aldehyde added also depends on the desired molecular weight and/or desired melt point for the final resin product.

Typically, the molar ratio of the amount of an aldehyde added altogether during the entire process to the total amount of alkylphenols and phenolic compounds added altogether during the entire process is no more than 1:1, or ranges from 0.5:1 to 1:1, or 0.8:1 to 1:1, or 0.9:1 to 1:1.

Suitable acids are the same as those suitable acidic catalysts that have been described above. Likewise, suitable aldehydes, and phenolic monomers have also been described above.

Suitable alkylphenols include alkylphenols in which the alkyl group of the alkylphenols contains 4 to 28 carbon atoms, 10 to 28 carbon atoms, 12 to 28 carbon atoms, 20 to 28 carbon atoms, or 24 to 28 carbon atoms. Exemplary alkylphenols include para-methylphenol, para-tert-butylphenol (PTBP), para-sec-butylphenol, para-tert-hexylphenol, para-cyclohexylphenol, para-heptylphenol, para-tert-octylphenol (PTOP), para-isooctylphenol, para-decylphenol, para-dodecylphenol (PDDP), para-tetradecylphenol, para-octadecylphenol, para-nonylphenol, para-pentadecylphenol, and para-cetylphenol. In one embodiment, the alkylphenols include $C_7$ alkylphenol, $C_8$ alkylphenol, $C_{12}$ alkylphenol, or mixture thereof. For instance, the alkylphenols include para-heptylphenol, PTOP, PDDP, or mixture thereof.

In an exemplary embodiment, the phenolic compound is phenol, and the phenolic compound further comprises resorcinol. When the phenolic compound is a mixture of phenol and resorcinol, it can contain about 15-85 wt % phenol and about 15-85 wt % resorcinol. For example, the phenolic compound can contain about 50-85 wt % phenol and about 15-50 wt % resorcinol, about 50-80 wt % phenol and about 20-50 wt % resorcinol, about 50-70% phenol and about 30-50 wt % resorcinol, about 50-66 wt % phenol and about 34-50 wt % resorcinol, or about 50-55 wt % phenol and about 45-50 wt % resorcinol.

An exemplary embodiment of this process is illustrated below in Scheme 2. The same stoichiometry as the reactions in Scheme 1 is used, but the reaction of preparing the resole resin is carried out in two phases. The first phase is similar to the reaction in Scheme 1, i.e., condensing the formaldehyde and an alkylphenol under basic conditions to methylolate alkylphenol to form a resole resin. Then, without adding an acid to neutralize the base in the resole resin, the second phase involves adding a phenolic monomer (e.g., phenol) to the reaction mixture, and continuing the condensation reaction under the basic condition to obtain the desired resin. The second phase involves a higher temperature than the first phase. The resin is then neutralized and an acid after the desired resin is prepared. Additional formaldehyde is then added to scavenge any remaining phenol in the novolac condensation. If desired, more aldehyde can be added to reach a desired molecular weight and/or melting point for the final resin product.

Scheme 2.
Reaction 2

Figure 1:
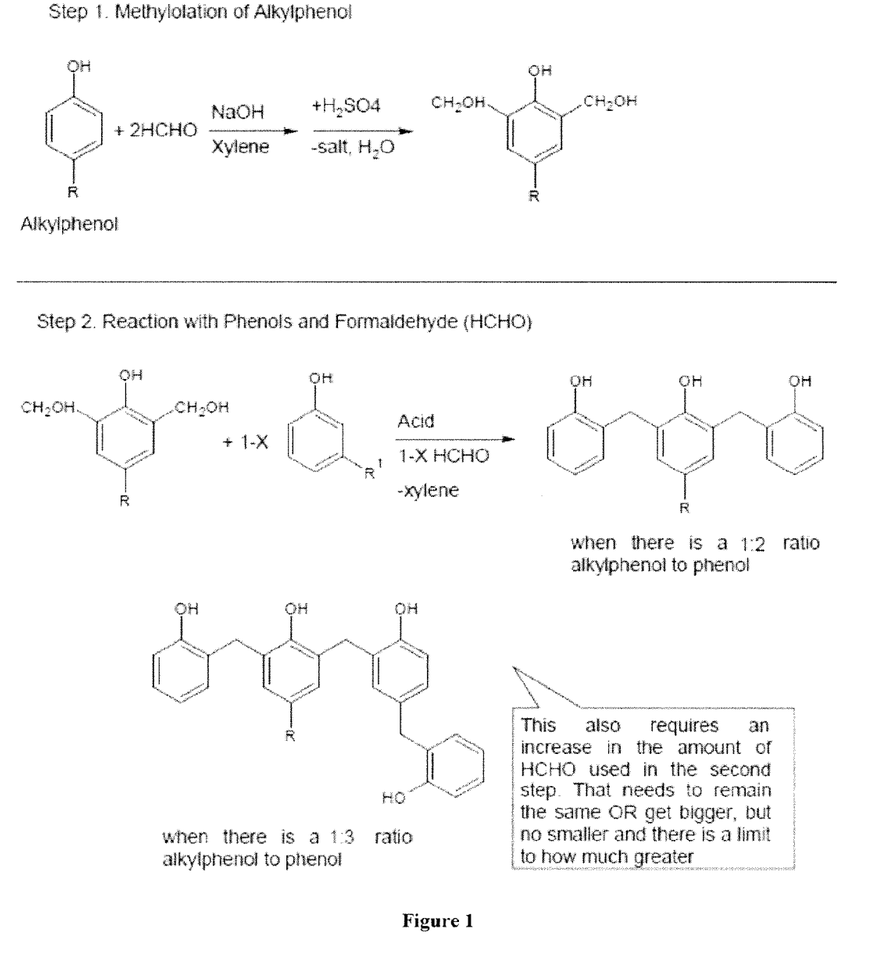
FIG. 1 is a reaction scheme showing an exemplary embodiment of the claimed process for preparing a novolac resin.

This exemplary process can be further illustrated in FIG. 1.

This invention also relates to a novolac resin prepared by the process as discussed in the above embodiments.

Accordingly, one aspect of the invention relates to a novolac resin prepared by a process comprising a step of reacting one or more alkylphenols with an aldehyde in the presence of a base to form a resole resin. For each mole of alkylphenol at least 1.5 moles of aldehyde are reacted. The resole resin is then reacted with one or more phenolic compounds under an elevated temperature. For each mole of alkylphenol at least 1.5 moles of the phenolic compounds are reacted. The novolac resin, when used in a rubber composition, improves the mixing viscosity for the rubber composition.

Suitable alkylphenols, aldehydes, bases, phenolic compounds, and acids, as well as suitable reaction conditions for preparing these novolac resins, are the same as those descriptions relating to the process as discussed in the above embodiments infra. The resulting novolak resins depend upon these starting materials and reaction conditions used.

Using the process as discussed in the above embodiments infra, the resulting novolac resin has a significantly reduced amount of residual phenolic monomers. For example, the residual alkylphenol monomer in the resins can be less than 2 wt %, less than 1 wt %, less than 0.5 wt %, or less than 0.1 wt %. The residual phenol monomer in the resins can be less than 2 wt %, less than 1 wt %, less than 0.5 wt %, or less than 0.1 wt %.

One benefit of the processes of the invention is the capability of incorporating a significantly higher amount of alkylphenols into the final novolac resins compared to a convention process by simply reacting the alkylphenols and/or phenol mixture with an acid and formaldehyde, when using the same ratios of phenolics (alkylphenols and/or phenol) to formaldehyde. The conventional process does not result in a material that incorporates the alkylphenols to any significant degree, and in general leads to a gelled product.

Accordingly, one aspect of the invention relates to a novolac resin prepared by the processes of the invention. The novolac resin comprises phenolic monomer units formed from: 33-85 wt % of one or more alkylphenols and 15-67 wt % of phenolic compound. For instance, The novolac resin may contain phenolic monomer units formed from: 50-85 wt % of one or more alkylphenols, or 50-75 wt % of one or more alkylphenols. Suitable alkylphenols and phenolic compounds are the same as those descriptions relating to the processes as discussed in the above embodiments infra.

In certain exemplary embodiments, the novolac resin comprises phenolic monomer units formed from: 33-85 wt % of one or more alkylphenols, 15-70 wt % of phenol, and 0-33 wt % of resorcinol. For instance, the phenolic monomer units may be formed from 33-75 wt % of one or more alkylphenols, 25-64 wt % of phenol, and 0-33 wt % of resorcinol; or the phenolic monomer units may be formed from 50-75 wt % of one or more alkylphenols, 25-50 wt % of phenol, and 5-20 wt % of resorcinol. In one embodiment, 50-75 wt % of the phenolic monomer units is form from one or more alkylphenols.

These novolac resins contain a significantly reduced amount of residual phenolic monomers. For example, the residual alkylphenol monomer in the resins can be less than 2 wt %, less than 1 wt %, less than 0.5 wt %, or less than 0.1 wt %. The residual phenol monomer in the resins can be less than 2 wt %, less than 1 wt %, less than 0.5 wt %, or less than 0.1 wt %.

Another aspect of this invention relates to a rubber composition reinforced with the novolac resins prepared according to the processes in this invention. The rubber composition comprises the novolac resin prepared according to the processes in above various embodiments infra. The rubber compound also includes a natural rubber, a synthetic rubber, or a mixture thereof. For instance, the rubber composition is a natural rubber composition. The rubber compound further includes one or more additive materials.

Alternatively, the rubber composition can be a synthetic rubber composition. Representative synthetic rubbery polymers include diene-based synthetic rubbers, such as homopolymers of conjugated diene monomers, and copolymers and terpolymers of the conjugated diene monomers with monovinyl aromatic monomers and trienes. Exemplary diene-based compounds include, but are not limited to, polyisoprene such as 1,4-cis-polyisoprene and 3,4-polyisoprene; neoprene; polystyrene; polybutadiene; 1,2-vinyl-polybutadiene; butadiene-isoprene copolymer; butadiene-isoprene-styrene terpolymer; isoprene-styrene copolymer; styrene/isoprene/butadiene copolymers; styrene/isoprene copolymers; emulsion styrene-butadiene copolymer; solution styrene/butadiene copolymers; butyl rubber such as isobutylene rubber; ethylene/propylene copolymers such as ethylene propylene diene monomer (EPDM); and blends thereof. A rubber component, having a branched structure formed by use of a polyfunctional modifier such as tin tetrachloride, or a multifunctional monomer such as divinyl benzene, may also be used. Additional suitable rubber compounds include nitrile rubber, acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers such as chloroprene rubbers, chlorosulfonated polyethylene rubbers, hydrogenated nitrile rubber, hydrogenated isoprene-isobutylene rubbers, tetrafluoroethylene-propylene rubbers, and blends thereof.

The rubber composition can also be a blend of natural rubber with a synthetic rubber, a blend of different synthetic rubbers, or a blend of natural rubber with different synthetic rubbers. For instance, the rubber composition can be a natural rubber/polybutadiene rubber blend, a styrene butadiene rubber-based blend, such as a styrene butadiene rubber/natural rubber blend, or a styrene butadiene rubber/butadiene rubber blend. When using a blend of rubber compounds, the blend ratio between different natural or synthetic rubbers can be flexible, depending on the properties desired for the rubber blend composition.

The novolac resin may be added to a rubber composition in the same amount, in the same manner and for the same uses as other known reinforcing resins. In one embodiment, the novolac resin is used in an amount ranging from about 0.1 per hundred rubber (phr) to 10 phr, for instance, from about 0.5 phr to 30 phr, from about 1 phr to about 20 phr, from about 1 phr to about 10 phr.

As discussed above, one benefit of the novolac resin prepared according to the processes of the invention is the ability, when used in a rubber composition, to improve the mixing viscosity of the rubber composition. This has the additional benefit of allowing more rubber additives or reinforcing fillers, such as carbon black and/or silica, to be added to rubber composition to improve performance. Rubber additives are typically added to a tire composition to improve the toughness of the tire, help conduct heat away from the tread and belt area of the tire to reduce thermal damage, and other modulus-related properties, all designed to increase the tire life. However, adding an increased amount of these additives typically increases mixing viscosity of the rubber composition, making the formulation process for the rubber compounds more difficult and less practical. When the novolac resin prepared according to the processes of the invention is used in combination with these additives, however, the mixing viscosity of the rubber composition is significantly reduced (while retaining substantially the same or having an increased modulus). This allows more additives, such as carbon black or silica, to be added without increasing the viscosity to an unacceptable level. For example, if the typical amount of these rubber additives in a rubber composition ranges from 25 phr to 90 phr, the amount of rubber additives could be increased about 5-25%, for instance, 5%, 10%, 15%, 20%, or 25%, all else being equal. This benefit is illustrated in Example 6.

Suitable additive materials include a methylene donor, one or more rubber additives, one or more other reinforcing materials, and one or more oils. As known to the skilled in the art, these additive materials are selected and commonly used in conventional amounts.

Suitable methylene donors include, for instance, hexamethylenetetramine (HMTA), di-, tri-, tetra-, penta-, or hexa-N-methylol-melamine or their partially or completely etherified or esterified derivatives, for example hexamethoxymethylmelamine (HMMM), oxazolidine or N-methyl-1,3,5-dioxazine, and mixtures thereof.

Suitable rubber additives include, for instance, sulfur, carbon black, zinc oxides, silica, waxes, antioxidant, antiozonants, peptizing agents, fatty acids, stearates, accelerators (e.g., sulfur accelerators), curing agents, activators, retarders (e.g., scorch retarders), a cobalt, adhesion promoters, resins such as tackifying resins (e.g., phenolic resins), plasticizers, pigments, additional fillers, and mixtures thereof.

Suitable other reinforcing materials include, for instance, nylon, rayon, polyester, aramid, glass, steel (brass, zinc or bronze plated), or other organic and inorganic compositions. These reinforcing materials may be in the form of, for instance, filaments, fibers, cords or fabrics.

Suitable oils include, for instance, mineral oils and naturally derived oils. Examples of naturally derived oils include tall oil, linseed oil, and/or twig oil. Commercial examples of tall oil include, e.g., SYLFAT® FA-1 (Arizona Chemicals) and PAMAK 4® (Hercules Inc.). The one or more oils may be contained in the rubber composition, relative to the total weight of rubber compounds in the composition, less than about 5 wt %, for instance, less than about 2 wt %, less than about 1 wt %, less than about 0.6 wt %, less than about 0.4 wt %, less than about 0.3 wt %, or less than about 0.2 wt %. The presence of an oil in the rubber composition may aid in providing improved flexibility of the rubber composition after vulcanization.

The rubber compositions can be vulcanized by using mixing equipment and procedures conventionally employed in the art, such as mixing the various vulcanizable polymer(s) with the novolac resins prepared according to the processes in this invention, and commonly used additive materials such as, but not limited to, curing agents, activators, retarders and accelerators; processing additives, such as oils; resins, including tackifying resins; plasticizers; pigments; additional fillers; fatty acid; stearates; adhesive promoters; zinc oxide; waxes; antioxidants; antiozonants; peptizing agents; and the like. As known to those skilled in the art, the additives mentioned above are selected and commonly used in conventional amounts.

The vulcanizable rubber composition can then be processed according to ordinary rubber manufacturing techniques. Likewise, the final rubber products can be fabricated by using standard rubber curing techniques. The reinforced rubber compounds can be cured in a conventional manner with known vulcanizing agents at about 0.1 to 10 phr. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination.

Curing may be conducted in the presence of a sulfur curing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. For instance, the curing agent may be soluble sulfur or a mixture of soluble and insoluble polymeric sulfur. The sulfur curing agents can be used in an amount ranging from about 0.1 to about 25 phr, alternatively from about 1.0 to about 10 phr, alternatively from about 1.5 to about 7.5 phr, alternatively a range of about 1.5 to about 5 phr.

The rubber composition reinforced with the novolac resins prepared according to the processes in this invention has a mixing viscosity significantly reduced while retaining substantially the same or having an increased modulus, compared to a rubber composition prepared with a phenol-aldehyde novolac resin. For instance, the rubber composition reinforced with the novolac resins prepared according to the processes in this invention can have a mixing viscosity reduced by at least about 10%, at least about 15%, at least about 20%, at least about 25%, or at least about 30% while retaining substantially the same or having an increased modulus, compared to a rubber composition prepared with a phenol-aldehyde novolac resin.

The rubber composition reinforced with the novolac resins prepared according to the processes in this invention exhibit superior properties, and thus can be useful to make a wide variety of products, for instance, tires or tire components such as sidewall, tread (or treadstock, subtread), carcass ply, body ply skim, wirecoat, beadfiller, or overlay compounds for tires. Suitable products also include hoses, power belts, conveyor belts, printing rolls, rubber shoe heels, rubber shoe soles, rubber wringers, automobile floor mats, mud flaps for trucks, ball mill liners, and weather strips.

Accordingly, one aspect of the invention relates to a tire composition reinforced with the novolac resins prepared according to the processes in this invention. The tire composition also includes a natural rubber, a synthetic rubber, or a mixture thereof. The tire composition further includes one or more additive materials. Suitable natural rubbers, synthetic rubbers, additive materials such as methylene donors, rubber additives, other reinforcing materials, and oils as well as curing techniques, curing agents, and curing conditions are the same as those descriptions relating to the rubber compositions discussed in the above embodiments infra.

EXAMPLES

The following examples are given as particular embodiments of the invention and to demonstrate the practice and advantages thereof. It is to be understood that the examples are given by way of illustration and are not intended to limit the specification or the claims that follow in any manner.

Example 1

Process 1 for Preparation of Resin A from PTOP and Phenol

In a polymerization kettle equipped with a reflux condenser, molten para-tert-octylphenol (PTOP) (1983 kg, 9.61 kmol) and xylene (1983 kg) were added and agitated until homogeneous. Water (1193 kg) followed by 50% aqueous sodium hydroxide (393 kg, 4.9 kmol) were charged into the kettle and were agitated while adjusting the batch temperature to 60° C. Using subsurface addition, 50% aqueous formaldehyde (1213 kg, 20.20 kmol) was then metered in the kettle over 133 minutes while keeping the batch temperate under 76° C. The batch was then agitated at 79° C. until the free formaldehyde was less than 1%. The base was then neutralized with 20% aqueous hydrochloric acid until a pH of 2 to 4 was obtained. The agitator was stopped, and the batch was allowed to settle while maintaining a temperature of 73° C. The lower water layer was then pumped off, fresh hot water (1101 kg) was added along with 85% aqueous phosphoric acid (39 kg), and the batch was agitated for 30 minutes. The agitator was stopped, and the batch was allowed to settle while maintaining a temperature of 73° C. The lower water layer was pumped off.

While agitating the batch, molten phenol (1615 kg, 17.16 kmol) was charged into the kettle. Oxalic acid (30 kg, 0.33 kmol) was added, and the batch was heated to atmospheric reflux. Additional xylene (881 kg) was added. Using subsurface addition, 50% aqueous formaldehyde (253 kg, 4.21 kmol) was metered in the kettle over 37 minutes while keeping the batch at atmospheric reflux. Atmospheric reflux was maintained until the free formaldehyde was less than 0.1%. The agitator was stopped, and the batch was allowed to settle while maintaining a temperature of 85° C. The lower water layer was pumped off.

The kettle was configured for atmospheric distillation, and the batch was heated to distill xylene. With a batch temperature of 160° C., vacuum was applied to continue the xylene distillation. With a batch temperature of 185° C., the batch was sampled for the melt point. Upon obtaining a melt point of 110-120° C., the kettle was pressurized with nitrogen, and the molten resin was flaked.

Example 2

Process 2 for Preparation of Resin A from PTOP and Phenol

Solid PTOP (1000 g, 4.846 mol) was charged in a polymerization kettle equipped with a reflux condenser. Xylene (900 g) was added, and the mixture was heated to 80-90° C. until dissolved. Using a dropping funnel, 50% aqueous sodium hydroxide (194 g, 2.423 mol) was added dropwise to the rapidly agitated batch. The batch was stirred until homogenous and was then cooled to 55-60° C. Using subsurface addition, 50% aqueous formaldehyde (597 g, 9.935 mol) was metered in the kettle while keeping the batch temperature below 65° C. The batch was then agitated at 65° C. until the free formaldehyde was less than 1%.

Molten phenol (917 g, 9.741 mol) was charged into the batch, and the batch was agitated until homogenous. Additional xylene (183 g) was added. The batch was heated to reflux and agitated for 3 hours. The batch was then cooled to 80° C. and acidified with 74% aqueous sulfuric acid until a pH 2-4 was obtained. The agitator was stopped and the batch was allowed to settle while maintaining a temperature of 80° C. The lower water layer was pumped off. Hot water (360 g) and 85% aqueous phosphoric acid (6 g) were added to the batch and were agitated for 30 minutes at 80° C. The agitator was stopped, and the batch was allowed to settle while maintaining a temperature of 80° C. The lower water layer was pumped off.

The kettle was configured for atmospheric distillation, and the batch was heated to distill xylene. With a batch temperature of 160° C., vacuum was applied to continue the xylene distillation. With a batch temperature of 160° C., the batch was sampled for a melt point of 110-120° C. Additional formaldehyde (125 g) was added to achieve that target melt point. Upon obtaining the melt point, the batch was vacuum-distilled to 185° C. and held under vacuum for 15 minutes. The kettle was pressurized with nitrogen, and the molten resin was flaked.

Example 3

Preparation of Resin B from PDDP and Phenol

Liquid para-dodecylphenol (PDDP) (380 g, 1.448 mol) was charged in a polymerization kettle equipped with a reflux condenser. Xylene (70 g) was added, and the mixture was heated to 80-90° C. until dissolved. Using subsurface addition, 50% aqueous sodium hydroxide (11.6 g, 0.145 mol) was added over 10 minutes. The batch was stirred until homogenous and was then cooled to 55-60° C. Using subsurface addition, 50% aqueous formaldehyde (89 g, 3.02 mol) was metered in the kettle while keeping the batch temperature below 65° C. The batch was then agitated at 65° C. until the free formaldehyde was less than 1%. The base was then neutralized with 1M aqueous hydrochloric acid until a pH of 3 to 4 was obtained. The agitator was stopped, and the batch was allowed to settle while maintaining a temperature of 70° C. The lower water layer was then pumped off, fresh hot water (210 kg) was added along with 85% aqueous phosphoric acid (7.5 kg), and the batch was agitated for 30 minutes. The agitator was stopped, and the batch was allowed to settle while maintaining a temperature of 70° C. The lower water layer was pumped off.

While agitating the batch, molten phenol (243 kg, 2.59 mol) was charged into the kettle. The batch was heated to reflux and agitated for 4 hours. The batch was then cooled to 80° C., and 50% aqueous formaldehyde (18.7 g, 0.62 mol) was metered in the kettle while keeping the batch temperature around 80° C. The batch was then heated to reflux and held until the free formaldehyde was less than 1%.

The kettle was configured for atmospheric distillation, and the batch was heated to distill xylene and water, with the water being drained. With a batch temperature of 160° C., vacuum was applied to continue the xylene distillation. With a batch temperature of 160° C., the batch was sampled for melt point of 110-120° C. Additional formaldehyde (80 g) was added to achieve that target melt point. Upon obtaining the melt point, the batch was vacuum-distilled to 180-185° C. and held under vacuum for 60 minutes. The kettle was pressurized with nitrogen, and the molten resin was flaked.

Example 4

Preparation of Resin C from PTOP and Mixture of Phenol (80%) and Resorcinol (20%)

In a polymerization kettle equipped with a reflux condenser, solid PTOP (540 g, 2.62 mol) and xylene (540 kg) were added and agitated at 60° C. until homogeneous. Water (324 g) followed by 50% aqueous sodium hydroxide (108 g, 1.35 mol) were charged into the kettle and were agitated while adjusting the batch temperature to 57-60° C. Using subsurface addition, 50% aqueous formaldehyde (330 g, 5.5 mol) was then metered in the kettle while keeping the batch temperate under 60° C. The batch was then agitated for 1 hour at 75° C. The base was then neutralized with 20% aqueous hydrochloric acid until a pH of 3 to 4 was obtained. The agitator was stopped, and the batch was allowed to settle while maintaining a temperature of 73° C. The lower water layer was then pumped off, fresh hot water (300 g) was added along with 85% aqueous phosphoric acid (10.75 g), and the batch was agitated for 30 minutes. The agitator was stopped, and the batch was allowed to settle while maintaining a temperature of 73° C. The lower water layer was pumped off.

While agitating the batch, molten phenol (351.4 g, 3.73 mol) and solid resorcinol (102.4 g, 0.93 mol) were charged into the kettle. Oxalic acid (7.6 g, 0.084 mol) was added, and the batch was heated to atmospheric reflux. Additional xylene (240 g) was added. Using subsurface addition, 50% aqueous formaldehyde (35 g, 0.58 mol) was metered in the kettle over 30 minutes while keeping the batch at atmospheric reflux. Atmospheric reflux was maintained until the free formaldehyde was less than 0.1%. The agitator was stopped, and the batch was allowed to settle while maintaining a temperature of 85° C. The lower water layer was pumped off.

The kettle was configured for atmospheric distillation, and the batch was heated to distill xylene. With a batch temperature of 160° C., vacuum was applied to continue the xylene distillation. With a batch temperature of 185° C., the batch was sampled for the melt point. Upon obtaining a melt point of 110-120° C., the kettle was pressurized with nitrogen, and the molten resin was flaked.

Example 5

Preparing and Evaluation of Rubber Compounds Modified with the Modified Phenolic Resins Mixing To demonstrate the effects of the unexpected benefits the modified phenolic resins can introduce into rubber compounds, the mixing viscosity of a typical tire formula (e.g., a "shoulder" rubber formula) was examined.

A shoulder rubber compound was prepared by modifying the rubber compound with a commercially available phenol-formaldehyde resin (HRJ-12952, available from SI Group, Inc.), Resin A prepared in accordance with the procedures as set forth in Example 1, and Resin B prepared in accordance with the procedures as set forth in Example 3, respectively. The amount of each resin added to the shoulder rubber formula was 10 phr.

The shoulder rubber formula used is shown below:

| Shoulder Rubber Formula | |
|---|---|
| Ingredient: | PHR: |
| SMR 20 | 100.00 |
| Zinc Oxide | 3.50 |
| Stearic Acid | 3.00 |
| Carbon Black, N375 | 22.50 |
| Carbon Black, N660 | 22.50 |
| Antiozonant 6PPD | 1.20 |
| Antioxidant TMQ (RD) | 0.50 |
| Insoluble Sulfur | 1.70 |
| TBBS | 1.40 |

Viscosity

The data from viscosity measurements for the shoulder rubber compound that is not modified ("blank") and the shoulder rubber compound that is modified with commercially available phenol-formaldehyde resin (P/F), Resin A, or Resin B are listed in Table 1.

TABLE 1

Viscosity Measurements in Shoulder Compound.
$\eta^*$ at 120° C.

| % Strain | | Resin A | Resin B | P/F | Blank |
|---|---|---|---|---|---|
| 0.05 | 0.698 | 144316 | 104309 | 129136 | 129804 |
| 0.09 | 1.2564 | 108088 | 87022 | 105757 | 110087 |

TABLE 1-continued

Viscosity Measurements in Shoulder Compound.
$\eta^*$ at 120° C.

| | % Strain | Resin A | Resin B | P/F | Blank |
|---|---|---|---|---|---|
| 0.15 | 2.094 | 91610 | 76149 | 96685 | 98290 |
| 0.26 | 3.6296 | 71985 | 58577 | 79654 | 80198 |
| 0.45 | 6.282 | 54498 | 45106 | 62662 | 64209 |
| 0.79 | 11.0284 | 40992 | 34551 | 48846 | 51373 |
| 1.37 | 19.1252 | 31570 | 27168 | 38243 | 41775 |
| 2.37 | 33.0852 | 24729 | 21654 | 29922 | 33854 |
| 4.12 | 57.5152 | 19409 | 17354 | 23130 | 26693 |
| 7.15 | 99.814 | 15458 | 14070 | 17736 | 20376 |
| High Strain decrease | | 24% | 31% | 13% | |

$\eta^*$ = complex viscosity

Figure 2:
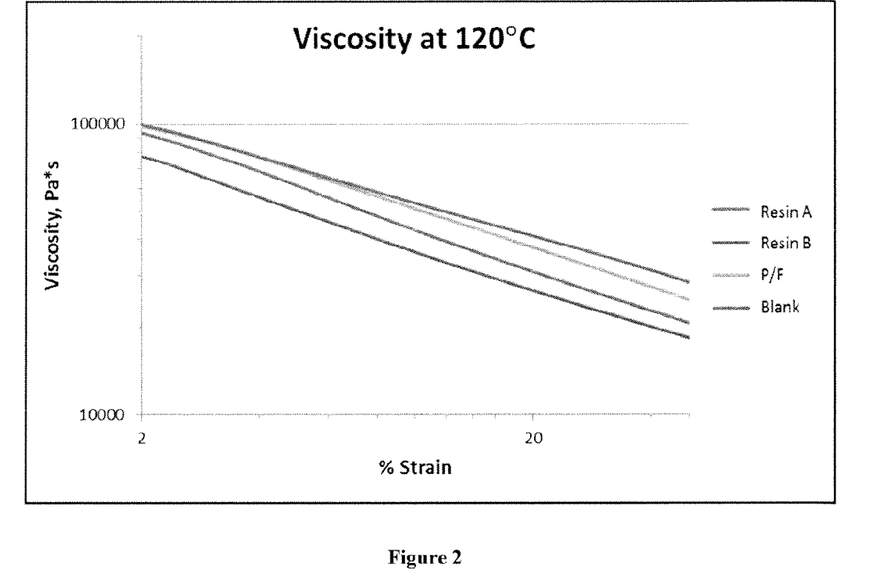
FIG. 2 is a graph comparing the results of viscosity versus shear for a shoulder rubber compound that is modified with commercially available phenol-formaldehyde resin (P/F), Resin A, or Resin B, against a shoulder rubber compound that is not modified ("blank").

The results of viscosity versus shear for the shoulder rubber compound modified with the commercially available P/F, Resin A, and Resin B are shown in FIG. 2. The data in FIG. 2 demonstrates that there is a near-constant decrease in viscosity in shoulder rubber formulas containing Resin A and Resin B across the entire shear range tested. These decreases were approximately 13% for the shoulder rubber formula containing Resin A and 30% for the shoulder rubber formula containing Resin B.

Curing

The effects of the modified phenolic resins on curing were also evaluated on an apex rubber compound modified with a commercially available P/F, Resin A, and Resin B.

The apex rubber formula is shown below:

| Apex Rubber Formula | |
|---|---|
| Ingredient: | PHR: |
| SMR 20 | 100.00 |
| Zinc Oxide | 4.00 |
| Stearic Acid | 2.00 |
| HMT (HEXA) | 1.00 |
| Carbon Black, N375 | 68.00 |
| Scorch Retarder PVI | 0.60 |
| Antioxidant IMQ (RD) | 3.00 |
| Plasticizer Oil | 2.00 |
| Tackifier Resin | 4.00 |
| Insoluble Sulfur | 4.00 |
| TBBS | 1.80 |

The data from viscosity measurements for the apex rubber compound that is not modified ("blank") and the apex rubber compound that is modified with commercially available P/F, Resin A, or Resin B are listed in Table 3.

TABLE 3

Viscosity Measurements in Apex Compound.
$\eta^*$ at 120° C.

| Angle | % Strain | P/F | Resin A | Resin B | Blank |
|---|---|---|---|---|---|
| 0.05 | 0.6975 | 104519 | 194342 | 107317 | 129804 |
| 0.09 | 1.2555 | 91096 | 139127 | 92928 | 110087 |
| 0.15 | 2.0925 | 84786 | 111476 | 78284 | 98290 |
| 0.26 | 3.627 | 70071 | 83469 | 60605 | 80198 |
| 0.45 | 6.2775 | 54921 | 61300 | 45381 | 64209 |
| 0.79 | 11.0205 | 42207 | 45776 | 34417 | 51373 |
| 1.37 | 19.1115 | 33115 | 34953 | 26867 | 41775 |
| 2.37 | 33.0615 | 25949 | 27160 | 21290 | 33854 |
| 4.12 | 57.474 | 20209 | 21065 | 16925 | 26693 |
| 7.15 | 99.7425 | 15606 | 16419 | 13552 | 20376 |
| High strain decrease | | 23% | 19% | 33% | |

The effects of the modified phenolic resins on curing were evaluated by a oscillating disk rheometer ("ODR"). This test measures the use of oscillating disk cure meter for determining selected vulcanization characteristics of vulcanizable rubber compounds. The tests were performed at 160° C. and the results are shown in Table 4.

TABLE 4

Curing of Apex Compounds with Reinforcing Resins.
ODR - 30' @ 160° C.

|  | t10(m · m) | t50(m · m) | t90(m · m) | tS1(m · m) | tS2(m · m) | ML(lb-in) | MH(lb-in) |
|---|---|---|---|---|---|---|---|
| P/F | 2.47 | 3.49 | 7.72 | 1.72 | 2.01 | 8.81 | 65.97 |
| Resin A | 3.25 | 4.41 | 8.38 | 1.98 | 2.46 | 6.95 | 64.85 |
| Resin B | 3.24 | 4.30 | 7.96 | 2.15 | 2.65 | 6.41 | 59.06 |
| BLANK | 4.45 | 5.60 | 6.82 | 3.01 | 3.62 | 9.68 | 62.12 |

The parameters t10, t50, and t90 are the time required for the occurrence of 10%, 50%, and 90% of the increase in torque, respectively, due to vulcanization (time at R/Rmax–Rmin). The parameters Rmax and Rmin are the maximum rheometer torque due to vulcanization) and minimum rheometer torque (before onset of vulcanization), respectively.

The minimum torque (or ML value) is the lowest value the rheometer measures and reflects the amount of energy required to turn (mix) the rubber compound in the instrument. While the P/F resin reduced the ML value by 9.0%, Resin A reduced the ML value by 28% and Resin B reduced the ML value by 34%.

The scorch or time to cure initiation is typically measured by the value of tS2 (or the time to an increase in the torque (S) of two units) in rubber testing. The P/F resin reduced the scorch time from 3.62 minutes for the blank compound to 2.01 minutes. Resin A's tS2 value was 2.46 minutes, which had an increase of 23% over P/F resin's tS2 value. Resin B's tS2 value was 2.65 minutes, which had an increase of 33% over the P/F resin's tS2 value.

Modulus v. Viscosity

Figure 3:
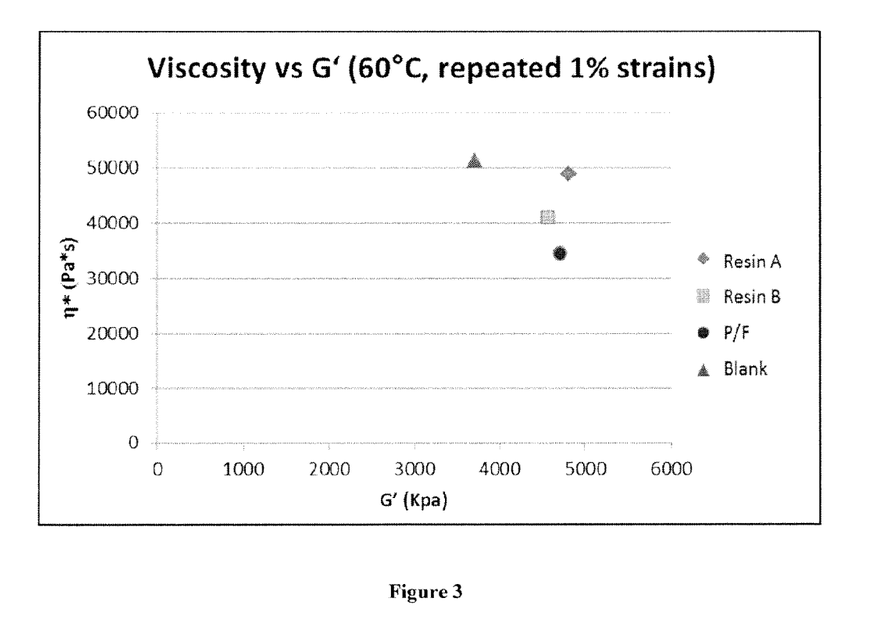
FIG. 3 is a graph comparing the results of dynamic modulus (G') at 1% strains of the cured rubber article, after repeated full-strains sweeps, for a shoulder rubber compound that is modified with commercially available P/F, Resin A, or Resin B, against a blank shoulder rubber compound.

FIG. 3 shows a plot of dynamic modulus (G') at 1% strains of the cured rubber article (after repeated full-strains sweeps). The blank had a viscosity of ~50,000 Pa*s and a modulus of ~3650 kPa. Adding a P/F resin had the desired effect of increasing the modulus to approximately 4900 kPa. However, as shown in FIG. 2, adding a P/F resin had little to no effect on the rubber formula's mixing viscosity. Resin A produced nearly the same increase in modulus as the P/F resin, but with a significant reduction in viscosity. Similarly, Resin B produced nearly the same increase in modulus and provided the same stiffness (G') to the final rubber compound as the P/F resin, but with reducing the viscosity by 30%.

Therefore, the overall combination of increasing the modulus or stiffness of the rubber compound while reducing the rubber formula's mixing viscosity makes these modified phenolic resins so unusual and unexpectedly better. While one can add plasticizers (for example, process oils) to reduce the mixing demands of a rubber formula, this type of process has the negative impact of reducing the stiffness of the final rubber compound. Thus, the rubber compounds of this invention represent an improvement in the art.

Example 6

Evaluation of Rubber Compounds Modified with the Modified Phenolic Resins

A model apex rubber compound was prepared by modifying a rubber compound with a commercially available tall-oil modified phenol-formaldehyde resin (SP-6701, available from SI Group, Inc.), Resin A prepared in accordance with the procedures set forth in Example 1, and Resin B prepared in accordance with the procedures set forth in Example 3, respectively. The amount of each resin added to the apex rubber formula was 10 phr.

Figure 4:
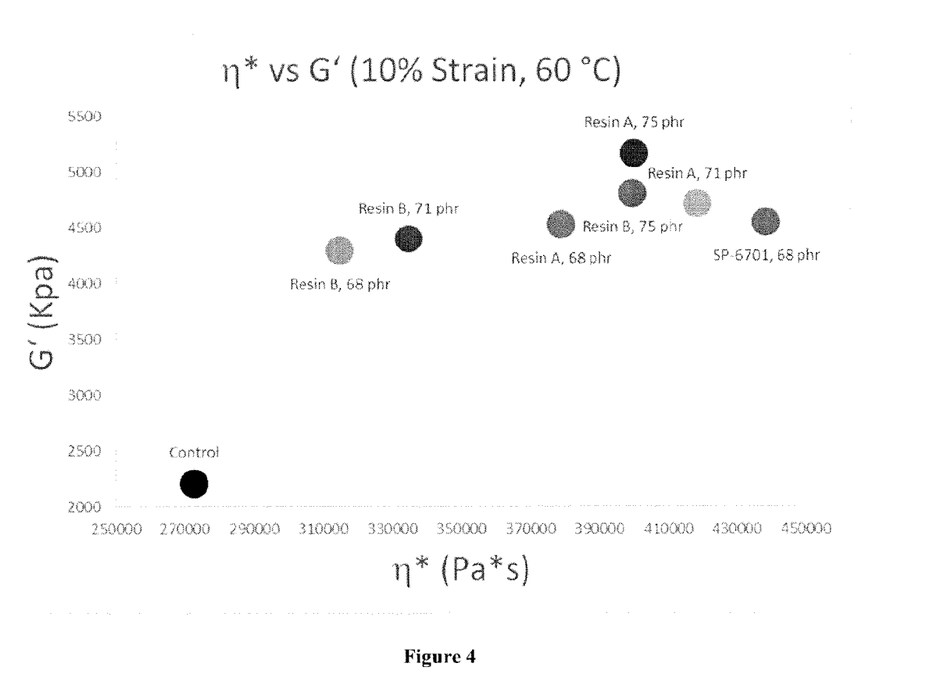
FIG. 4 is a graph comparing the results of dynamic modulus versus mixing viscosity for a cured rubber compound that is modified with commercially available tall-oil modified P/F, Resin A, or Resin B, against a control (i.e., a blank rubber compound that is not modified with a reinforcing resin), with various amounts of carbon black added into the rubber compound.

To demonstrate the effects of the unexpected benefits the modified phenolic resins can introduce into rubber compounds, tire formulas modified by the commercially available tall-oil modified phenol-formaldehyde resin, Resin A, and Resin B, with various amounts of additives (i.e., N375, a type of carbon black) were examined to evaluate their dynamic modulus (G') and mixing viscosity ($\eta$*). The results are compared against a control (i.e., a blank rubber compound that is not modified with a reinforcing resin), and are shown in FIG. 4. FIG. 4 demonstrates that adding modified phenolic resins such as Resin A and Resin B into the rubber compound can significantly reduce the mixing viscosity ($\eta$*) of a rubber formulation. This reduction in mixing viscosity allows the rubber formulation to accommodate more carbon black than the commercially available tall-oil modified phenol-formaldehyde resin, while retaining or having improved dynamic elastic modulus (G'), compared to the commercially available tall-oil modified phenol-formaldehyde resin.

TABLE 5

Viscosity and Dynamic Modulus Measurements in
Rubber Compounds Modified with Reinforcing Resins.

| Sample (10 phr resin) | $\eta$* (Pa*s) | G' (kPa) | N375 (phr) |
|---|---|---|---|
| Control* | 272796 | 2207 | 68 |
| SP-6701 | 438768 | 4545 | 68 |
| Resin A | 379165 | 4525 | 68 |
| Resin B | 314888 | 4287 | 68 |
| Resin A | 418592 | 4711 | 71 |
| Resin B | 334756 | 4402 | 71 |
| Resin A | 400255 | 5169 | 75 |
| Resin B | 399830 | 4808 | 75 |

Note:
*0 phr resin added.

Although preferred embodiments have been depicted and described in detail herein, it will be apparent to those skilled in the art that various modifications, additions, substitutions, and the like can be made without departing from the spirit of the invention and these are therefore considered to be within the scope of the invention as defined in the claims which follow.

What is claimed is:
1. A process for preparing a novolac resin, comprising:
   (a) reacting one or more alkylphenols having an alkyl group of 8-12 carbons with an aldehyde in the presence of a base to form a resole resin, wherein for each mole of alkylphenol at least 1.5 moles of aldehyde are reacted, and (b) reacting the resole resin with one or more phenolic compounds in the presence of an acidic catalyst to form a novolac resin, wherein for each mole of alkylphenol at least 1.5 moles of the phenolic compounds are reacted, wherein step (b) further comprises, after the step of reacting the resole resin with one or more phenolic compounds, adding additional aldehyde, wherein the novolac resin has a residual alkylphenol of less than 1% without being subjected to a distillation process.

2. The process of claim 1, wherein at least one alkyl group in the alkylphenols is not $C_8$.

3. The process of claim 1, wherein one or more alkyl groups in the alkylphenols is $C_8$ or $C_{12}$ alkyl.

4. The process of claim 1, wherein the phenolic compound is phenol.

5. The process of claim 4, wherein the phenolic compound further comprises resorcinol.

6. The process of claim 5, wherein the phenolic compound contains about 50-80 wt % phenol and about 20-50 wt % resorcinol.

7. The process of claim 1, wherein the aldehyde is formaldehyde.

8. The process of claim 1, wherein the step of reacting one or more alkylphenols with an aldehyde is conducted at a temperature ranging from 50 to 90° C.

9. The process of claim 1, wherein the step of reacting the resole resin with one or more phenolic compounds is conducted at a temperature ranging from room temperature to 130° C.

10. A process for preparing a novolac resin, comprising:
(a) reacting one or more alkylphenols having an alkyl group of 8-12 carbons with an aldehyde in the presence of a base to form a resole resin, wherein for each mole of alkylphenol at least 1.5 moles of aldehyde are reacted, (b) reacting the resole resin with one or more phenolic compounds at an elevated temperature to form a novolac resin, wherein for each mole of alkylphenol at least 1.5 moles of the phenolic compounds are reacted, wherein step (b) further comprises, after the step of reacting the resole resin with one or more phenolic compounds, neutralizing the resole resin with an acid and adding additional aldehyde, wherein the novolac resin has a residual alkylphenol of less than 1% without being subjected to a distillation process.

11. The process of claim 10, wherein one or more alkyl groups in the alkylphenols is $C_8$ or $C_{12}$ alkyl.

12. The process of claim 10, wherein the phenolic compound is phenol.

13. The process of claim 12, wherein the phenolic compound further comprises resorcinol.

14. The process of claim 13, wherein the phenolic compound contains about 50-80 wt % phenol and about 20-50 wt % resorcinol.

15. The process of claim 10, wherein the aldehyde is formaldehyde.

16. The process of claim 10, wherein the step of reacting one or more alkylphenols with an aldehyde is conducted at a temperature ranging from 50 to 90° C.

17. The process of claim 10, wherein the step of reacting the resole resin with one or more phenolic compounds is conducted at a temperature ranging from 100° C. to 200° C.

18. The process of claim 1, further comprising the step of subjecting the novolac resin to a distillation process.

19. The process of claim 10, further comprising the step of subjecting the novolac resin to a distillation process.

\* \* \* \* \*